July 5, 1955   L. D. ANDERSON   2,712,261
THUMB TACK HAVING RUBBER POINT GUARD
Filed Dec. 28, 1951
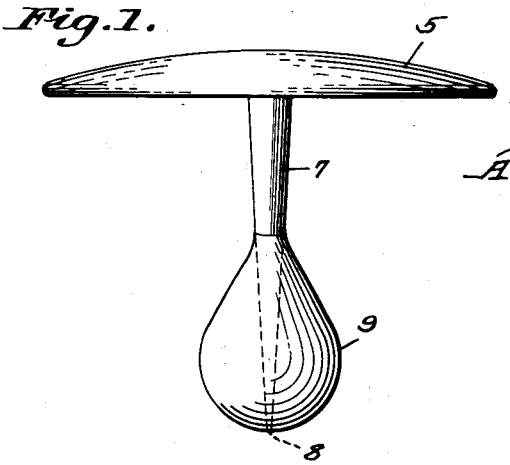
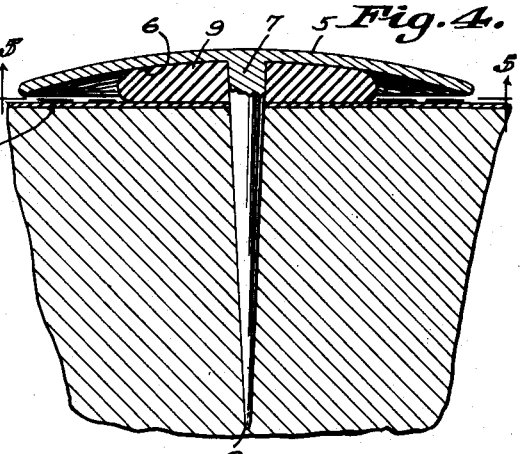
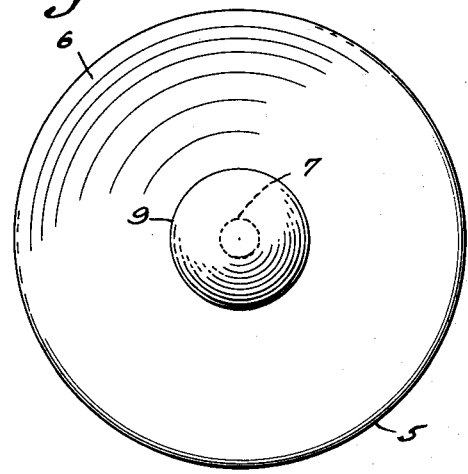
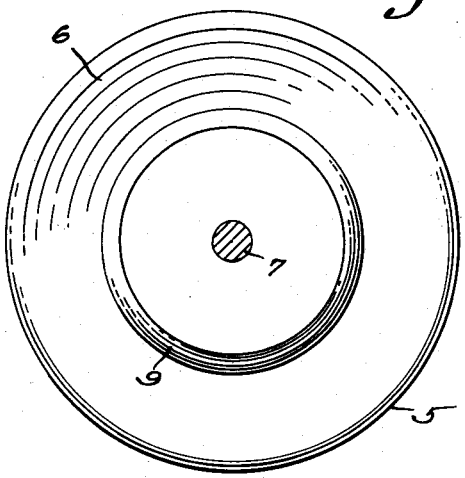
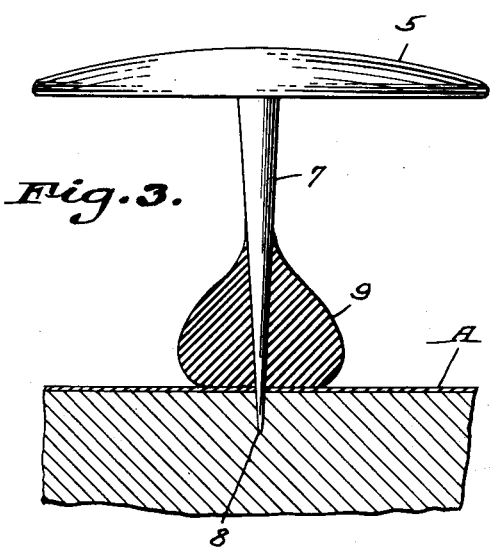
L. D. Anderson
INVENTOR
BY C. A. Snow & Co.
ATTORNEYS.

2,712,261
THUMB TACK HAVING RUBBER POINT GUARD

Lincoln D. Anderson, Hanford, Calif.

Application December 28, 1951, Serial No. 263,730

1 Claim. (Cl. 85—16)

This invention relates to thumb-tack having rubber point guard construction, the primary object of the invention being to provide a thumb-tack wherein the pointed stem thereof is protected by a bulb of solid rubber formed on the pointed end of the thumb-tack shank, completely encasing the pointed end of the tack, thereby guarding against injury to the hands of the person handling the thumb-tack, due to the extremely sharp ends of thumb-tacks.

Another important object of the invention is to provide a friction member which will automatically move from the pointed end of the thumb-tack shank, along the shank to a position in contact with the head of the thumb-tack, during the positioning of the thumb-tack, the friction member being compressed under the force used in seating the thumb-tack, causing the friction member to spread over the paper held by the thumb-tack, preventing the tearing of the paper.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of a thumb-tack constructed in accordance with the invention.

Fig. 2 is a bottom plan view of the thumb-tack.

Fig. 3 is an elevational view illustrating the shank of the thumb-tack as partially forced through the rubber bulb formed on the pointed end of the shank.

Fig. 4 is a sectional view illustrating the rubber bulb as flattened under the pressure used in positioning the thumb-tack to create friction between the paper and thumb-tack.

Fig. 5 is a sectional view taken on the line 5—5 of Fig. 4.

Referring to the drawing in detail, the thumb-tack comprises the head 5, which is of the usual curved construction providing a concaved lower surface 6.

The shank of the thumb-tack is indicated by the reference character 7 and tapers to a sharp point 8 which under normal conditions is guarded by the rubber bulb 9.

This rubber bulb 9 is formed on the pointed end of the shank by submerging the pointed end of the shank in melted rubber of a consistency to solidify in the form of a bulb completely surrounding and encasing the pointed end of the shank of the tack. Under normal conditions this rubber bulb provides a protecting means to permit the handling of the thumb-tack without danger of the pointed end of the shank piercing the hand or fingers of the person. However, when it is desired to position the thumb-tack in securing a sheet of paper such as indicated at A in Fig. 4 of the drawing, to a support, the thumb-tack is forced into the paper and support in the usual manner. As the tapered shank of the thumb-tack moves through the paper and support to contact with the under surface of the head 5 of the thumb-tack, the rubber bulb 9 will be compressed and flattened, lying within the concaved portion of the thumb-tack and frictionally engaging the paper a substantial distance from the shank of the thumb-tack to prevent tearing of the paper.

From the foregoing it will be seen that due to the construction shown and described, I have provided a thumb-tack which under normal conditions is guarded to prevent injury and at the same time afford means for holding a paper secured by the thumb-tack against tearing loose from the thumb-tack.

Having thus described the invention, what is claimed is:

A thumb tack comprising a head, a pointed shank extending from the head, a rubber bulb molded on the pointed end of said shank in spaced relation with the head and guarding the pointed end of the shank and normally concealing said pointed end of the shank, said pointed end of the shank adapted to be extended through said rubber bulb, and said rubber bulb adapted to move over said shank to a position between the head of the thumb tack and article supported thereby, holding said article against accidental displacement.

References Cited in the file of this patent

UNITED STATES PATENTS

| Number | Name | Date |
|---|---|---|
| 42,228 | Sanders | Apr. 5, 1864 |
| 957,154 | Gallinek | May 3, 1910 |
| 1,605,695 | Baloyan | Nov. 2, 1926 |
| 2,224,941 | Weimer | Dec. 17, 1940 |
| 2,374,436 | Kennedy et al. | Apr. 24, 1945 |

FOREIGN PATENTS

| Number | Country | Date |
|---|---|---|
| 15,869 | Great Britain | July 17, 1896 |